(No Model.) 2 Sheets—Sheet 1.
C. W. EDGAR.
COTTON HARVESTER.
No. 555,439. Patented Feb. 25, 1896.
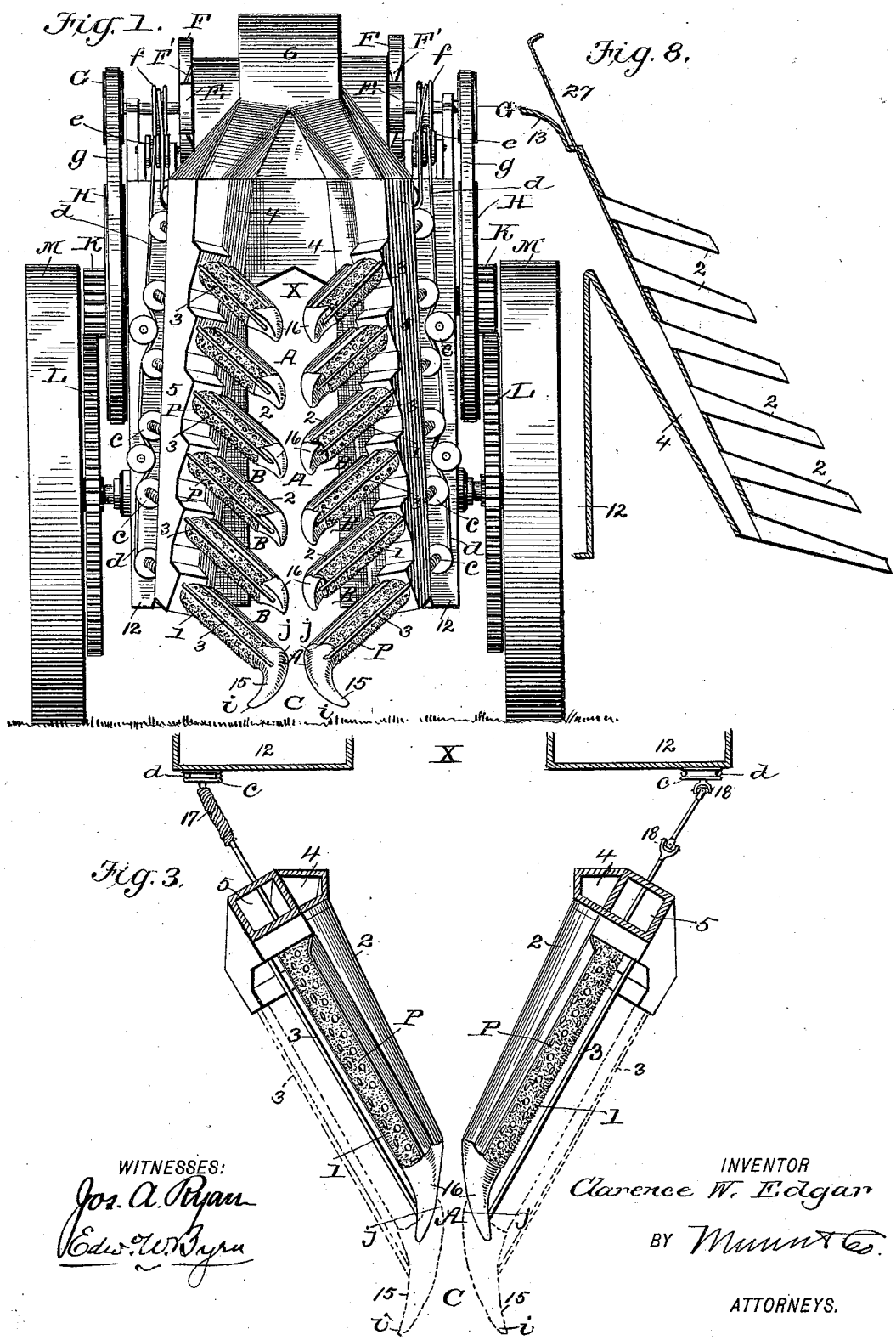

(No Model.) 2 Sheets—Sheet 2.
C. W. EDGAR.
COTTON HARVESTER.
No. 555,439. Patented Feb. 25, 1896.
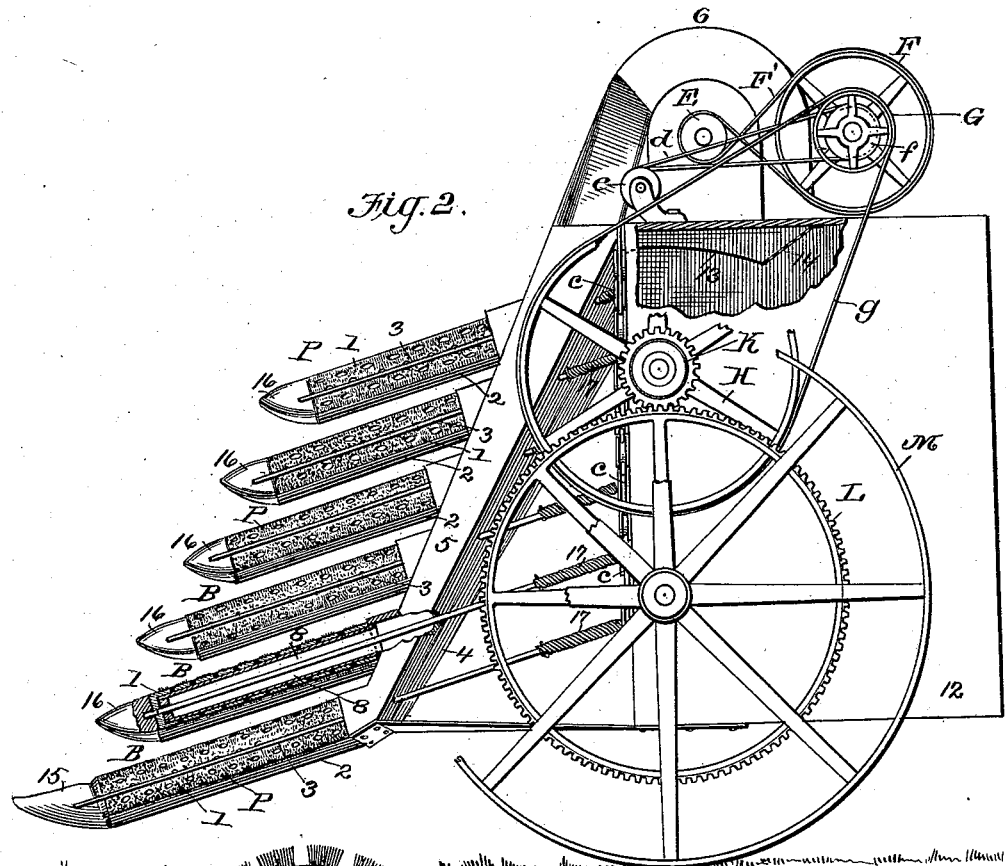
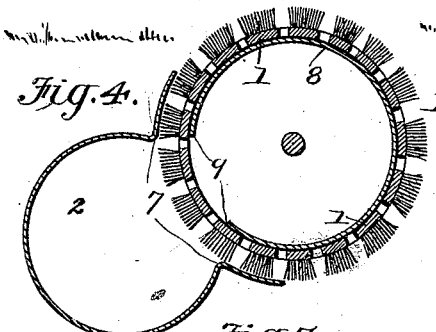
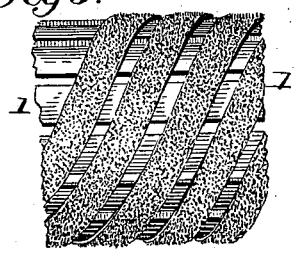
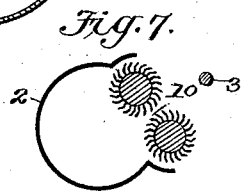
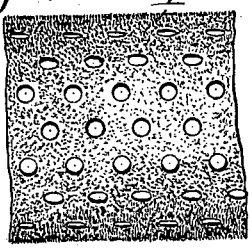
WITNESSES:
Jos. A. Ryan
Edw. W. Byrn
INVENTOR
Clarence W. Edgar.
BY Munn & Co.
ATTORNEYS.

UNITED STATES PATENT OFFICE.

CLARENCE WM. EDGAR, OF TOLEDO, OHIO.

COTTON-HARVESTER.

SPECIFICATION forming part of Letters Patent No. 555,439, dated February 25, 1896.

Application filed May 27, 1895. Serial No. 550,889. (No model.)

*To all whom it may concern:*

Be it known that I, CLARENCE WM. EDGAR, of Toledo, in the county of Lucas and State of Ohio, have invented a new and useful Improvement in Cotton-Harvesters, of which the following is a specification.

My invention relates to improvements in cotton-harvesting machines in which a rotary gathering device is employed to extract the cotton from the open bolls, and the pneumatic system is employed as an auxiliary to the gathering device to aid the rotary gatherers to remove the cotton from the same and to convey it to a proper receiver.

The objects sought in my invention are, first, to arrange the picking mechanism in such a manner that it will have a thorough, uniform and easy passage among the limbs and stalks of the cotton-plants with a maximum picking capacity and a minimum amount of resistance from the obstructions of the limbs and stalks in order to reach all open cotton-bolls hanging on the limb, however situated; second, to provide a means of removing the cotton when gathered from off the picking mechanism without withdrawing such mechanism from among the stalks, thus requiring no more pickers to be employed than are at one time engaged among the limbs of the cotton-plant; third, to provide an improvement of the gathering mechanism that will secure an improved gathering action to the picking-surfaces of the gathering device; fourth, to enable the pickers to release the cotton easily and quickly at the proper place and time; fifth, to provide an improvement in conveying and delivering cotton when gathered from the gathering mechanism to a suitable receiver; sixth, to provide a means of regulating the air-currents when the plants are short and low and only the lower pickers are engaged therein, so as to apply air only to the gathering mechanism that is engaging cotton; seventh, to provide a means of straightening up or lifting while picking any plant or plants that may be leaning from an upright position in order to allow the pickers an easy passage among the limbs; eighth, to simplify the mechanical construction, so that the machine will be light, compact, simple, and free from complications and requiring but small power to operate. I attain these objects by mechanism illustrated by the accompanying drawings, in which—

Figure 1 is a front view of the machine. Fig. 2 is a side view of the same, partly in section. Fig. 3 is a plan view of a pair of pickers arranged in relation to their coacting parts and others of the series, as shown in dotted lines. Fig. 4 is a cross-sectional view, on a larger scale, of the picking device. Figs. 5 and 6 are views of spindle and spindle-covering. Fig. 7 is a sectional view of a modified form of picking device comprising a pair of small spindles with but one suction-tube common to both. Fig. 8 is a sectional side view of the regulating device for cutting off the air-currents from a portion of the picking devices.

In the drawings, 12 12 represent two hollow legs of the machine, forming receptacles for the picked cotton. These legs are supported upon the running-wheels M M and are separated a distance apart, as shown at X, sufficient to receive the stalks and limbs of the row of cotton-plants being picked.

By a peculiar arrangement of the gathering mechanism, as hereinafter described, I secure a uniform, continuous and thorough passage of the pickers among the limbs and stalks of the cotton-plant and at the same time maintain the device in position for continuous gathering action, and by virtue of the position in which the pickers are held I secure the best gathering action attainable at a low relative speed of the spindles, and while maintaining such position among the stalks and limbs of the plants I provide means of removing the cotton from the pickers as fast as it is gathered by them. To secure such a result I employ a system of pneumatic-delivery suction-tubes 2, guards 3, guides 16, and pickers 1 in sets of as many as may be required on each side of the cotton-row. These pickers are supported from framework at one end only, having the other ends free in extended position, so that they may enter among the limbs of the plant-like projecting fingers with but little obstruction to the movement being offered by the limbs and stalks.

As the natural positions of the limbs are upward and outward from the center stalks, I incline the pickers downward and inward from each side toward the stalk, so as to coincide as nearly as practicable with the limbs in cross-section and to secure for them easy passage among the limbs as the machine moves forward. They are made to extend forwardly also. In this manner the pickers first engage the plants near the center line of the cotton-row, space A being left between the sets of pickers so that they may pass by the sides of the central stalks without interfering with or injuring them. The pickers pass among the limbs in a comb-like manner, the spaces B B B being large enough for the limbs to be drawn through without injury to them or to the bolls that may not be opened.

The sets of pickers passing by the sides of the stalks and the picker-stems entering among the limbs near the stalks by virtue of their forward, downward, and inward projection the place of contact between the pickers and limbs shifts along the length of the limbs from the stalk outward and upward their entire length, allowing the pickers fair opportunity to gather the open cotton which may be on the limbs.

The entire mechanical arrangement of the sets of pickers is designed with the intention of securing a comb-like passage of the pickers among the limbs in order to allow the picking device opportunity for thorough gathering action without disturbing or injuring the limb more than is avoidable. The individual gathering devices being maintained in an obliquely forward position, a relatively large portion of their picking-surfaces will pass any given part of the plant, as an open boll, and there being a larger surface exposed to the boll, and also a longer time required in passing than would be if the pickers were set directly crosswise of the cotton-row, the picking-spindles will not require as great a rotative speed as if crosswise set.

The gathering mechanism is maintained in substantially a constant position, although flexible attachments 17 or joints 18 (shown on the right of Fig. 4) may be used to allow individual picker-stems or sets of stems to yield somewhat when encountering obstacles that would be liable to do injury. As the picking devices are maintained in a constant position among the limbs of the plants in order to remove the cotton from their surface when gathered, I employ a peculiar picking device, which I will now describe.

A rotary spindle, brush, finger, or stem 1 is held in an obliquely downward, forward, and inward position, as previously described herein, and has its surface made of a suitable nature to engage the cotton when being rotated—as, for instance, it may be covered with cardcloth, hair, bristle, or wire-brush cloth or teeth projecting from its surface, which picking-surface extracts the cotton from out of the bolls when passing among the limbs, as hereinbefore described. Along the length of the picking-surface of this rotary gatherer I place a parallel suction-tube 2, having an opening 7, Fig. 4, in its side adjacent to the spindle 1, which opening has flanged lips along its edges. This suction-tube 2 is of the nature of a branch from the main suction-pipe 4, (see Fig. 8,) which communicates with the receiver 12, from which the air is exhausted by the fan or blower 6. As the receiver 12 and the pipe 4 are made air-tight, with openings only through the tubes 2, the air rushing over the face of spindle 1 and through openings 7 to replace that exhausted from the receiver sucks the gathered cotton from off the rotary picker 1 and carries it into the receiver 12. The air rushing to the spindle 1 to enter the openings 7 of the suction-tube 2 also draws with it any loosely-hanging cotton that may be near to the surface of the rotary gatherer, which catches it and draws it out of the boll or off the limbs that it may be hanging to and delivers it into the tubes 2, from which it is carried to the receiver, as described.

To facilitate the spindles releasing the cotton from the brushes, card-clothing, teeth, or other gathering-surface, I make the spindle of a hollow tube, into which the air is forced by the fan or blower 6 through the pipe 5, Figs. 2 and 4, and the spindle 1 being perforated or slotted throughout its entire gathering-surface the air when returned from the fan 6 is blown through the perforations, removing the cotton from the gathering-surface and delivering it into the tube 2, from which it is drawn, as described, into the receiver 12. The fan or blower 6 exhausting the air from the receiver 12 passes it back again through the pipe 5 and into the spindle 1, thus making a practically-closed circuit, the only opening to the outside atmosphere being the small one between the spindle 1 and the tube 2.

To prevent the air within the spindle from blowing the cotton in other directions than into the tube 2, I insert a slotted cylindrical shield 8 within the spindle 1, which shield fits closely to the inner surface of the hollow spindle, preventing the inclosed air from escaping through all of the perforations of the spindle 1 except those in front of the slot 9 in the side of the shield that is adjacent to the opening 7 of the tube 2. This arrangement permits the air to be blown only into the opening 7 of the tube 2; or the air need not be returned from the fan 6 if the spindle be made of such open construction that air may pass freely through its sides; or two spindles of small diameter may be used together with each suction-tube 2, as shown in Fig. 7, the currents of air removing the cotton by passing between the spindles through the space 10, the object sought being the same in each instance—viz., the removal of the cotton from the picking-spindles by the currents of air rushing through the perforations of the spindles and by currents of air passing close to the picking-surfaces of the spindles when such air-currents are entering the opening 7 of the tube 2.

An additional facility for engaging the open cotton may be secured to the gathering-surface by the induced air-currents drawing the open cotton onto the picking-surface when the suction only is employed, and the air is not returned from the fan 6, and the spindles are such as I have just described.

Any perforated spindle may be used and may be constructed as follows: The tube forming the body of the spindle may be slotted in its sides, as in Fig. 5, and spirally wrapped with card-clothing, cloth, rubber, leather or other material, having hair, bristles, or wire inserted in it to make a gathering-surface, or any other suitable wrapping, leaving spaces between the coils or turns of wrapping for air-passage; or the spindle may be perforated through both body and covering, as in Fig. 6, or be of open construction when wrappings are not employed.

The gathering-spindles may be operated by any suitable mechanism, as small flexible shafting 17 operated by pulleys $c$ and belt $d$ passing over guide-pulley $e$ to a drive-pulley $f$. This latter is on the same shaft with pulleys F and G. F, through belt F', drives pulley E on the blower-shaft, while G receives motion through belt $g$ from a pulley H which is rigid with gear-wheel K, and which latter receives motion from gear L on drive-wheel M.

To raise and hold fallen cotton-plants in an upright position I arrange at the lower ends of the bottom pair of picker-stems guide-shoes 15, projecting outward and forwardly. These guide-shoes draw the leaning plants between the points of the bottom pair of pickers, and as each succeeding pair of pickers above are set somewhat behind those immediately beneath them and are provided with small points or guides 16 reaching out from the forward end of the pickers, so as to retain the stock in an upright position until the next pair above can catch them, all such leaning plants are straightened and the limbs left free to spread and pass through the spaces B B B between the pickers.

The guide-shoes 15 are made so that the points $i$ $i$ are wider apart than the heels $j$ $j$, thus making the opening at C wider than the opening at A, by this means allowing the points $i$ $i$ of an upper pair of the guide-shoes to reach out wider than and forwardly over the heels $j$ $j$ of the pair of guide-shoes next beneath them, as shown in Fig. 3. By this arrangement the stalks are prevented from drawing away from one pair of pickers before the next pair above and behind them can catch them, and this keeps the stalk in the space A between the sets of pickers until the limbs have passed through the spaces B B between the spindles.

In order to separate the cotton from the air before the air reaches the fan 6, I connect the pipe 4 to the receiver 12, which is air-tight except at the openings 7 of the tubes 2, and the air being partially exhausted therefrom by means of the blower 6 the air-currents, when entering the receiver 12 from the tubes 2, pipe 4, and spindles 1, bringing the cotton therefrom, are directed downward by the plate 13, Figs. 2 and 8, and the receiver being large in proportion to the pipe 4 the air-currents lose their velocity and allow the cotton to fall to the bottom of the receiver before the air is drawn through the screen 14 to the blower 6.

When operating in cotton that is not tall enough for all the pairs of spindles to engage, a reduction of the amount of air required to be handled by the blower 6 may be effected by closing off the suction-tubes not in use. I do this by placing the slide 27, Fig. 8, over the opening into the pipe 4 of the tubes 2 of such tubes 2 that with their pickers are not in the cotton.

I am aware that rotating spindles have been used for cotton-harvesters and that various pneumatic systems have been invented, and do not therefore broadly claim such as my invention; but in my invention the rotary gathering device and the pneumatic system perform separate offices, but mutually contribute to assist each other in securing a practical harvesting action.

Having thus described my invention, what I claim as new, and desire to secure by Letters Patent, is—

1. In a cotton-harvester, the combination of a set of convergent rotary spindles each having a gathering-surface on its periphery as described, a parallel suction-tube arranged beside each spindle and inclosing one side of the peripheries of said spindles, and a suction-fan communicating with each tube to transfer the cotton from the spindles to the suction-tubes as described.

2. In a cotton-harvester, the combination of a rotary spindle having gathering-surfaces on its periphery as described a suction-tube arranged parallel to said spindle and inclosing one side of the same, and a suction-fan having a connection applied to said suction-tube as specified.

3. In a cotton-harvester the combination with the hollow revolving perforated picker-spindle; of tube 2 having opening 7 in proximity with the surface of the spindle, and a suction device communicating with tube 2 to remove the cotton therefrom substantially as shown and described.

4. In a cotton-harvesting machine the combination of a gathering device consisting of a hollow rotary spindle, having a surface of card-clothing, or its described equivalent to engage and extract the cotton from the bolls and perforated through its gathering-surface, a parallel suction-tube arranged beside the spindle, and a fan or blower having its suction-inlet communicating with the suction-tube as described and for the purposes stated.

5. In a cotton-harvesting machine the combination of the hollow rotary picking-spindles perforated and covered as described, a hollow suction-tube arranged parallel beside the same, and a fan or blower having its suction side connected with the suction-tube, and its pressure side connected with the hollow spindle substantially as and for the purpose described.

6. In a cotton-harvester the combination of a supporting-frame and the picking-spindles arranged in two converging series projecting in downward forward and inward position, that conforms to the natural position of the limbs of the plants in order that the gathering device may enter centrally and move freely among the limbs of the plants substantially as shown and described.

7. In a cotton-harvester the combination with the hollow rotary perforated picking-spindle, a suction-tube with lateral opening arranged parallel beside the spindle, and a slotted cylindrical shield arranged within the picker-spindle with its slot opposite the lateral opening of the tube to concentrate the blast in a line opposite the suction-tube substantially as described and for the purpose specified.

8. In a cotton-harvesting machine the combination with a hollow revolving picker of a pressure-conduit for compressed air arranged on one side of the picker-surface, a suction-conduit arranged on the other side, a fan or blower having its suction and pressure sides connected respectively to these conduits, to utilize a closed pneumatic circuit to dislodge the cotton and carry it to a receiver substantially as shown and described.

9. A cotton-harvester having gathering devices constructed in the form of a brush with openings through it from which the cotton is removed by both a suction and pressure of air, inclosing-chambers on opposite sides of the brush an air-tight receiver 12 with screen 14 into which the cotton is delivered from the gathering mechanism by a continuous circulation of the same body of air and a fan or blower for circulating this body of air through said receiver and the open brush as described.

10. In a cotton-harvester using rotary gathering-spindles set obliquely and in receding order one above another the combination therewith of flexible shafting to rotate the spindles substantially as shown and described.

11. In a cotton-harvester the combination of the picker-spindles arranged in pairs and placed in receding order one above another and having at the ends of the lowest pair inclined guide-shoes 16 for the purpose of lifting and maintaining in erect position the fallen cotton-plants while gathering therefrom as described.

12. In a cotton-harvester the combination of two series of picker-spindles arranged convergently, and extending forwardly, downwardly, and inwardly, with a space between the two series for the cotton-plants and having at the ends of the lowermost pair inclined guide-shoes 16 as described and for the purpose specified.

13. In a cotton-harvester the combination of a series of picker-spindles having individual suction-tubes 2 and a trunk or conduit 4 communicating therewith, and the slide 27 arranged between the open ends of the suction-tubes and the conduit to shut off suction from the picking mechanism that is not engaged in the cotton-plants substantially as described.

14. In a pneumatic cotton-harvester the combination of a hollow revolving picking-surface made in the form of a brush with openings through it, a fan or blower, and a trunk or conduit for directing a pressure-blast through the picking-surface from the interior outwardly to dislodge the cotton therefrom substantially as shown and described.

Buffalo, New York, May 11, 1895.

CLARENCE WM. EDGAR.

Witnesses:
WILLIAM LOWERY,
JOHN A. McDOUGALL.